104/8A

United States Patent Office 3,475,185
Patented Oct. 28, 1969

3,475,185
ALKALI METAL SILICATE BINDER FOR ZINC-RICH PAINTS

Helmut von Freyhold, Dusseldorf-Oberkassel, Germany, assignor to Philadelphia Quartz Company, Philadelphia, Pa., a corporation of Pennsylvania No Drawing. Filed Aug. 4, 1967, Ser. No. 658,361
Claims priority, application Germany, Sept. 2, 1966, H 60,401
Int. Cl. C09d 5/10
U.S. Cl. 106—1 6 Claims

ABSTRACT OF THE DISCLOSURE

A zinc-rich paint composition composed of an alkali metal silicate solution, a water soluble quaternary ammonium base having the general formula $NR_1R_2R_3R_4OH$ wherein $R_1$, $R_2$ and $R_3$ are groups consisting of alkyl and alkanol radicals with 1–12 carbons and $R_4$ is an alkyl radical with 1 to 4 carbons and finely divided metallic zinc.

Alkali metal silicate binders for zinc rich paints are improved by the addition of quaternary ammonium bases having the general formula $NR_1R_2R_3R_4OH$ in which $R_1$, $R_2$ and $R_3$ are alkyl or alkanol radicals with 1 to 12 carbon atoms, and $R_4$ is an alkyl radical with 1 to 4 carbon atoms.

The use of alkali metal silicate binders with metallic powders such as zinc for forming coating compositions is well known. They are very useful for protecting metals, particularly iron and its alloys, from corrosion when exposed to the weather or sea water. It is also well known that alkali metal silicates react rather quickly with zinc giving off hydrogen and developing pressure in closed containers. U.S. Patent No. 3,093,493 describes the addition of a mixture of diamino compounds and potassium chromate which combination inhibits the production of hydrogen for a considerable period. However, these paints still suffer from reaction with $CO_2$ from the air which leads to poor brushability and short stability or pot-life. My present invention provides an improvement, especcially in the brushability and pot-life of the resulting paint systems. It is very desirable to have binders based on alkali metal silicates which not only have good brushability, good leveling without mud-cracking but also a short setting time of the coating and a long pot-life.

It is, therefore, an object of this invention to produce coating compositions consisting predominantly of metallic powder such as zinc dust, aluminum or lead, an alkali metal silicate binder, and certain additives which improve the brushability of the final composition. These compositions also level well without mud-cracking or crazing. While the setting time of the paint film or binder is considerably shorter, the pot-life is increased markedly.

THE INVENTION

In its broadest aspects this invention encompases a binder for use with cements or coating compositions, for instance, comprising:

(a) an aqueous alkali metal silicate solution,
(b) a quaternary ammonim base having the general formula $NR_1R_2R_3R_4OH$ wherein $R_1$, $R_2$ and $R_3$ belong to the group consisting of alkyl or alkanol radicals with 1 to 12 carbon atoms, and $R_4$ is an alkyl radical with 1 to 4 carbon atoms.

The radicals $R_1$, $R_2$ and $R_3$ may be the same or different and may be straight chain or branched. I prefer quaternary ammonium bases which contain alkanol and/or alkyl radicals with 1–4 carbon atoms since these are more readily obtainable. The preferred bases are tetraethanolammonium hydroxide, tetraethylammonium hydroxide, methyl triethanolammonium hydroxide and tetramethylammonium.

More narrowly, it encompasses a corrosion resistant coating for metals, particularly ferrous metals, comprising the above binder mixed with a finely divided metal powder. The binder may contain a minor amount of an alkali metal chromate or other additives useful for the development of desirable characteristics in the compositions of my invention.

The preferred alkali metal silicate is sodium silicate although potassium silicate is quite satisfactory. While the precise ratio is not critical, I prefer a ratio of $SiO_2:Na_2O$ or $SiO_2:K_2O$ of 2 to 4.4:1. Concentration of the alkali metal silicate solutions may also vary consierably but I prefer solutions with a solids content of 20 to 50%.

Zinc powder is the preferred metallic powder. The exact particle size of the zinc powder is not critical although it has been generally observed that the effectiveness of the coating composition improves as the particle size decreases. The very finely divided zinc powders which will even react with water to give off hydrogen are especially preferred. By way of specific example, particle sizes below 200 mesh are desirable and particle sizes below 325 mesh are especially preferred. In general, more zinc is added on a weight basis than sodium silicate, and I prefer to add about 2 to 6 times as much.

A further improvement in the pot-life of the compositions of my invention can be made by the addition of 0.1 to 0.4 weight percent based on the alkali metal silicate solution of an alkali metal chromate. The sodium or potassium chromates and dichromates are preferred because of their availability.

It is found that these new compositions when compared with the combinations using previously known binders have a much improved brushability, extended pot-life and a shorter setting time for the film after application.

The binder itself is produced by mixing the individual components and further processing of the binder may be done in the usual way by adding the individual fillers, pigments or other components of the paint, cement or corrosion-resistant paint in the usual amounts. These new binders are extremely well suited for use in cements, paints and corrosion-resistant paints, particularly metal pigment paints such as those prepared with powdered zinc.

OTHER COMPONENTS

On occasion it may prove desirable to incorporate other ingredients with the components of the invention in order to achieve certain specifically desired properties in the final coating. For example, the coating composition may be thickened by adding about 0.01–3.0 weight percent based on the whole mixture of sodium alginate, methyl cellulose or starch. In many cases it is helpful to add small amounts in the order of 0.5 to 2% by weight of emulsifying agent such as ethylene oxide, addition compounds and fatty alcohols or fatty acids. In order to increase the adherence of the coating, especially to sheet metal surfaces which have not been completely degreased, it is advantageous to add about 0.5 to 2.0 weight percent of methyl or ethyl acetate. Kaolin, bentonite and montmorillonite clays, as well as zinc oxide, may be added as extenders.

EXAMPLES

The following examples are presented to illustrate the invention and particularly preferred embodiments thereof. Unless otherwise specified, the parts and percentages are by weight and the temperature is at room temperature. It should be understood that these examples are not intended to limit the invention and that obvious changes may be made by those skilled in the art without changing the essential characteristics and the basic concept of the invention.

Example 1

24 kilograms of a sodium silicate solution having a mol ratio of $SiO_2$:$Na_2O$ of 3.8:1 and a solids content of 29% were mixed with 5 kilograms of water and 1 kilogram of an aqueous tetraethylammonium hydroxide solution sold by Schuchard Co. and containing 20% tetraethylammonium hydroxide. This binder composition was added to 110 kilograms of zinc dust having an average particle size less than 10 microns. The zinc dust paint obtained had a useful viscosity for application as a spray for over 24 hours, whereas the pot-life without the additive was about 4 hours.

This paint was easily sprayed and it was not necessary to clean the nozzle during the full spray period. A film 70 microns thick can be applied by one spray coat without mud-cracking or crazing. In ten minutes the coating had set sufficiently to resist solution by hot water whereas the same composition without the addition of the quaternary ammonium base required at least an hour to develop resistance against hot water.

Example 2

Another binder was prepared using 590 grams of a potassium silicate solution having a mol ratio of $SiO_2$,$K_2O$ of 2.58:1 and a concentration of 28 to 30° Baumé mixed with 50 grams of a 20% solution of the same tetraethylammonium hydroxide and 150 grams of water. This vehicle or binder was mixed with 100 grams of talc and 200 grams of kaolin and 100 grams of titania forming a paint mixture which was stable for practically an unlimited time in closed containers and when used as a paint for concrete dried in air within 15 minutes and it became water-resistant within 2 to 3 hours. A similar paint without the addition of quaternary ammonium base had an air drying time of about 30 minutes and a similar water-resistance after drying in a dry atmosphere was obtained only after 2 or 3 weeks.

Example 3

3 grams of the 20% tetraethylammonium hydroxide solution and 1 gram of ammonium dichromate were dissolved in 24 grams of deionized water and this mixture was added with agitation to 215 grams of a sodium silicate solution having a mol ratio of $SiO_2$:$Na_2O$ of 3.8:1 and a solids content of 29%. The vehicle prepared in this way was mixed with 1100 grams of zinc dust having a particle size of 10 microns. The pot-life of this composition was 16 to 20 hours. A similar material prepared without the additives of this invention could not be used after 3 to 5 hours.

CONCLUSION

More or less specific claims will be presented hereinafter and even though such claims are rather specific in nature to those skilled in the art to which this invention pertains will recognize that there are obvious equivalents for the specific materials recited therein. Some of these obvious equivalents are disclosed herein and other obvious equivalents will immediately occur to one skilled in the art and still other obvious equivalents could be readily ascertained upon rather simple routine non-inventive experimentation. Certainly no invention would be involved in substituting one or more of such obvious equivalents for the materials specifically recited in the claims. I intend that all such obvious equivalents be encompassed within the scope of this invention and patent grant in accordance with the well-known doctrine of equivalents as well as changed proportions of the ingredients which do not render the composition unsuitable for the disclosed purposes.

The term "consisting essentially of" as used in the following claims is meant to include compositions containing the named ingredients in the proportions stated, and any other ingredients which do not destroy the usefulness of the compositions for the purposes stated in the specification.

What is claimed is:

1. A binder for cements and coating compositions consisting essentially of an alkali metal silicate solution having a ratio of silica to alkali oxide in the range of 2:1 to 4.4:1 and a solids content in the range of from about 20 to 50% by weight and a water-soluble quaternary ammonium base having the general formula $$NR_1R_2R_3R_4OH$$

wherein $R_1$, $R_2$ and $R_3$ are of the group consisting of alkyl and alkanol radicals with 1 to 12 carbon atoms and $R_4$ is an alkyl radical with 1 to 4 carbon atoms, said quaternary ammonium base being present in an amount between about 0.2 and 5.0 weight percent based on the alkali metal silicate.

2. The binder of claim 1 which contains in addition an alkali metal chromate in an amount between about 0.1 and 0.4% by weight based on the alkali metal silicate.

3. A corrosion-resistant coating composition having an improved pot-life and a reduced setting time consisting essentially of the following in combination:

(a) a finely divided metallic zinc,
(b) alkali metal silicate solution,
(c) 0.2 to 5.0% of water soluble quaternary ammonium base of claim 1 calculated on the basis of the alkali metal silicate solution.

4. The corrosion-resistant coating composition of claim 3 to which has been added 0.1 to 0.4% by weight based on the alkali metal silicate solution of alkali metal chromate.

5. The coating composition of claim 3 in which at least one of the radicals $R_1$, $R_2$ and $R_3$ is an alkanol.

6. The method of producing the binder of claim 1 in which the quaternary ammonium base is mixed with the alkali metal silicate solution.

References Cited

UNITED STATES PATENTS

| | | | |
|---|---|---|---|
| 3,372,038 | 3/1968 | Wilhelm et al. | 106—1 |
| 3,301,853 | 1/1967 | Wilhelm | 106—38.35 |
| 3,248,237 | 4/1966 | Wilhelm et al. | 106—287 X |
| 2,689,245 | 9/1954 | Merrill | 260—247 |

JULIUS FROME, Primary Examiner

T. MORRIS, Assistant Examiner

U.S. Cl. X.R.

106—14, 209, 214; 117—131, 135.1